US011143382B2

(12) United States Patent
Huang et al.

(10) Patent No.: US 11,143,382 B2
(45) Date of Patent: Oct. 12, 2021

(54) OPTICAL LENS STRUCTURE

(71) Applicant: Chun Kuang Optics Corp., Hsinchu County (TW)

(72) Inventors: Hsin-Chieh Huang, Hsinchu County (TW); Sheng-Jung Lin, Hsinchu County (TW); Shun-Wen Teng, Hsinchu County (TW)

(73) Assignee: CHUAN KUANG OPTICS CORP., Hsinchu County (TW)

( * ) Notice: Subject to any disclaimer, the term of this patent is extended or adjusted under 35 U.S.C. 154(b) by 0 days.

(21) Appl. No.: 17/037,625

(22) Filed: Sep. 29, 2020

(65) Prior Publication Data

US 2021/0108780 A1 Apr. 15, 2021

(30) Foreign Application Priority Data

Oct. 9, 2019 (TW) .................................. 108136489

(51) Int. Cl.
*F21V 5/04* (2006.01)
*F21V 7/04* (2006.01)

(52) U.S. Cl.
CPC ................ *F21V 5/045* (2013.01); *F21V 7/04* (2013.01)

(58) Field of Classification Search
CPC .......... F21V 5/045; F21V 5/10; F21V 7/0091; F21V 13/04; F21L 15/10; G02B 2003/0093; G02B 3/03; G02B 3/04
See application file for complete search history.

(56) References Cited

U.S. PATENT DOCUMENTS

| 10,830,411 | B2 * | 11/2020 | Jou | F21V 5/04 |
| 2009/0086498 | A1 * | 4/2009 | Condon | B63B 45/04 |
| | | | | 362/477 |
| 2011/0235338 | A1 * | 9/2011 | Chen | G02B 19/0061 |
| | | | | 362/311.02 |
| 2012/0051047 | A1 * | 3/2012 | Lu | G02B 3/0056 |
| | | | | 362/235 |
| 2012/0287649 | A1 * | 11/2012 | Kelley | G02B 19/0028 |
| | | | | 362/335 |
| 2017/0074483 | A1 * | 3/2017 | Yu | F21V 5/045 |
| 2019/0162389 | A1 * | 5/2019 | Shah | F21S 43/14 |

FOREIGN PATENT DOCUMENTS

WO WO-2006072885 A1 * 7/2006 .............. F21V 5/006

\* cited by examiner

*Primary Examiner* — Keith G. Delahoussaye
(74) *Attorney, Agent, or Firm* — Chun-Ming Shih; HDLS IPR Services

(57) ABSTRACT

An optical lens structure includes a main body portion and a projection portion. One side of the main body portion is recessed to form an opening and a light incident portion corresponding to the opening. The main body portion has a plurality of first reflection sides and a plurality of second reflection sides arranged opposite to the plurality of first reflection sides. Each of the plurality of second reflection sides is recessed to form a recessed portion. The projection portion arranged on the other side of the main body portion. One side of the projection portion faced away from the main body portion is recessed to form a through opening and a light emitting portion. The light incident portion receives and refracts a plurality of external light beams, so that one part of the plurality of external light beams is projected to the light emitting portion.

8 Claims, 17 Drawing Sheets

OPTICAL LENS STRUCTURE

BACKGROUND

Technical Field

The present disclosure relates to an optical lens structure, and more particularly to an optical lens structure that can reduce glare and increase utilization rate of large-angle light.

Description of Related Art

The statements in this section merely provide background information related to the present disclosure and do not necessarily constitute prior art.

Please refer to FIG. 1 to FIG. 3. FIG. 1 is a schematic diagram of a structure and optical path of a conventional optical lens. FIG. 2 is a light distribution curve of a cartesian coordinates of FIG. 1. FIG. 3 is a diagram of light pattern corresponding to FIG. 1. As shown in the preceding figures, an upper surface of conventional optical lens E has a light emitting surface, a lower surface of the conventional optical lens E has a light incident surface, and a light emitting module (no reference number in figures) is arranged below the light incident surface. Therefore, after the light emitting module projects light, the light enters the optical lens E by the light is refracted in the light incident surface of the optical lens E. Afterward, the light entering the optical lens E is projected to a scattered light by the light is refracted in the light emitting surface.

The conventional optical lens E is an open structure, and therefore, the light projected by the light emitting module has serious glare in irradiation range after the light is refracted in the conventional optical lens E. In addition, the large-angle light generated by the light is refracted in the conventional optical lens E will scatter to sides of the conventional optical lens E, and will reduce the utilization rate of the light.

Therefore, how to overcome the above-mentioned shortcomings by improving structural design and improving overall lighting effect of the optical lens has become the most important issue of the present disclosure.

SUMMARY

The present disclosure provides an optical lens structure to solve the technical problems of the related art.

In order to solve above the technical problems of the prior art, a technical solution of the present disclosure is to provide an optical lens structure. The optical lens structure includes a main body portion and a projection portion. One side of the main body portion is recessed to form an opening and a light incident portion corresponding to the opening, the main body portion has a plurality of first reflection sides and a plurality of second reflection sides arranged opposite to the plurality of first reflection sides. Each of the plurality of second reflection sides is recessed to form a recessed portion. The projection portion arranged on the other side of the main body portion, one side of the projection portion faced away from the main body portion is recessed to form a through opening and a light emitting portion corresponding to the through opening. The light incident portion receives and refracts a plurality of external light beams, so that one part of the plurality of external light beams is projected to the light emitting portion, another part of the plurality of external light beams is projected to the plurality of first reflection sides and the plurality of second reflection sides, and further another part of the plurality of external light beams is reflected and projected toward the light emitting portion by the plurality of first reflection sides and the plurality of second reflection sides. The plurality of external light beams projects a plurality of irradiation ranges separated from each other by the plurality of the external light beams being refracted in the light emitting portion.

A beneficial effect of the present disclosure is that the optical lens structure of the present disclosure can reduce glare and increase utilization rate of large-angle light by following technical solutions. One side of the main body portion is recessed to form the opening and the light incident portion corresponding to the opening, the main body portion has the plurality of first reflection sides and the plurality of second reflection sides arranged orthogonal to the plurality of first reflection sides. Each of the plurality of second reflection sides is recessed to form the recessed portion. The projection portion arranged on the other side of the main body portion, one side of the projection portion faced away from the main body portion is recessed to form the through opening and the light emitting portion corresponding to the through opening. The light incident portion receives and refracts the plurality of external light beams, so that one part of the plurality of external light beams is projected to the light emitting portion, another part of the plurality of external light beams is projected to the plurality of first reflection sides and the plurality of second reflection sides, and further another part of the plurality of external light beams is reflected and projected toward the light emitting portion by the plurality of first reflection sides and the plurality of second reflection sides. The plurality of external light beams projects the plurality of irradiation ranges separated from each other by the plurality of the external light beams being refracted in the light emitting portion.

In order to further understand features and technical content of the present disclosure. Please refer to the following detailed description and drawings of the present disclosure. The drawings are provided for reference and description only, and are not intended to limit the present disclosure.

DETAILED DESCRIPTION

The following are specific examples to illustrate the implementation of an "optical lens structure" of the present disclosure. A person skilled in the art can understand the advantages and effects of the present disclosure from the content disclosed in this specification. The present disclosure may be implemented or applied through other different specific embodiments, and various details in this specification may also be based on different viewpoints and applications, and various modifications and changes may be made without departing from the concept of the present disclosure. In addition, the drawings of the present disclosure are merely schematic illustrations, and are not drawn according to actual dimensions, and are stated in advance. The following embodiments will further describe the relevant technical content of the present disclosure in detail, but the disclosed content is not intended to limit the protection scope of the present disclosure.

It should be understood that although terms such as "first", "second", and "third" may be used herein to describe various elements or signs, these elements or signs should not be limited by these terms. These terms are mainly used to distinguish one element from another, or one sign from another sign. In addition, the term "or" used in this text may include any one or a combination of more of the associated listed items depending on the actual situation.

First Embodiment

Figure 4:
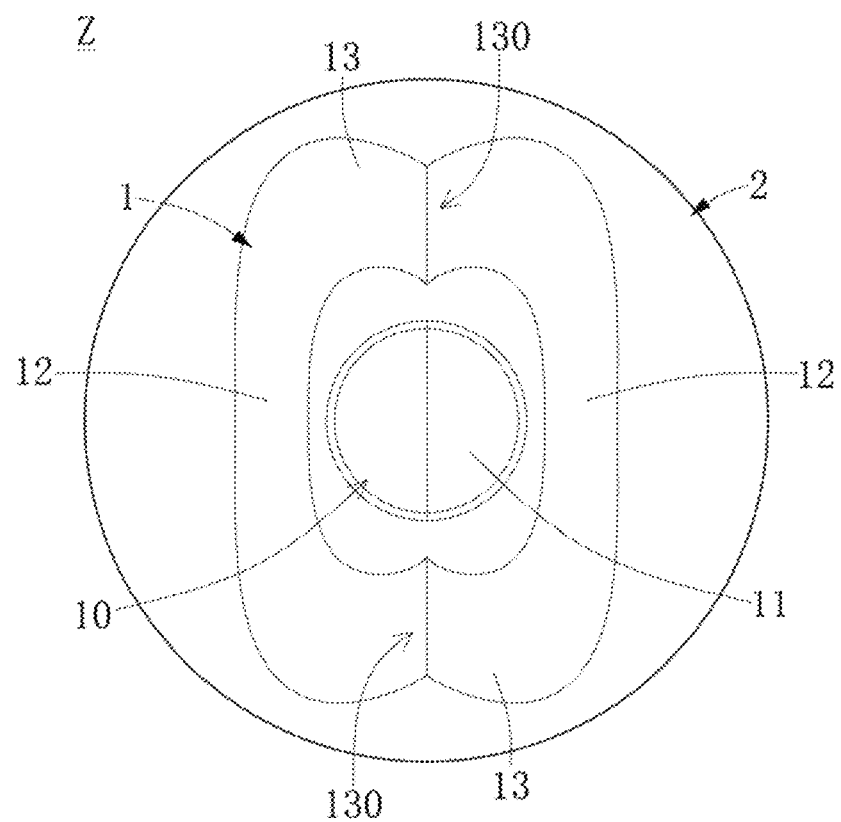
FIG. 4 is a bottom view of a first embodiment of an optical lens structure of the present disclosure.
Figure 5:
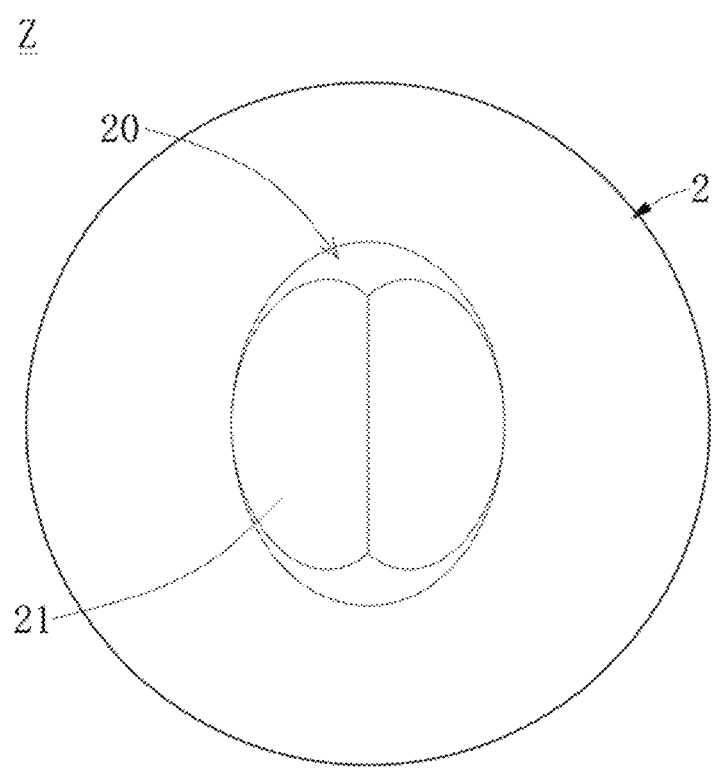
FIG. 5 is a top view of the first embodiment of the optical lens structure of the present disclosure.
Figure 6:
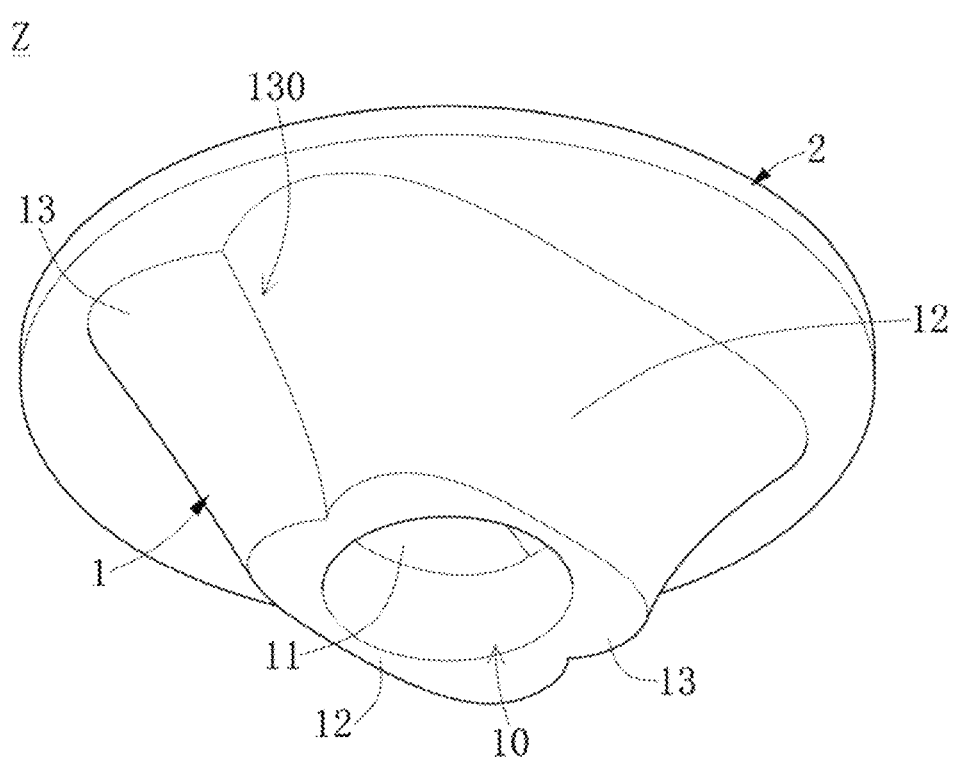
FIG. 6 is a perspective view of the first embodiment of the optical lens structure of the present disclosure.
Figure 7A:
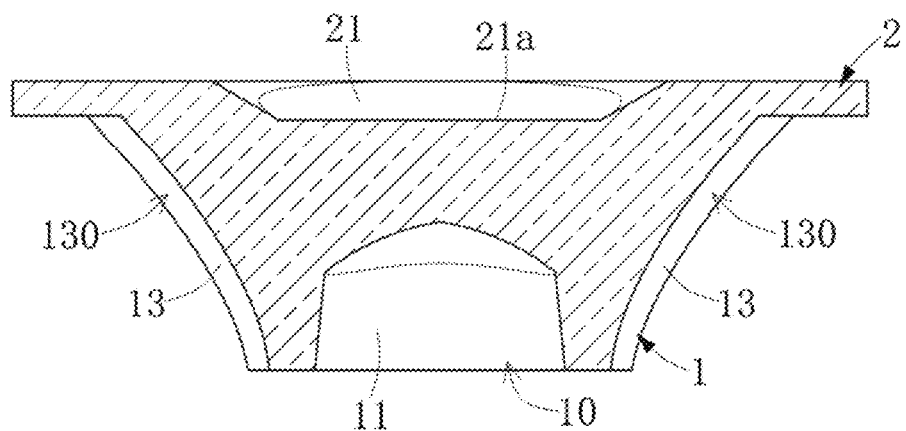
FIG. 7(a) to FIG. 7(c) are first cross-sectional views of the first embodiment of the optical lens structure of the present disclosure.
Figure 7B:
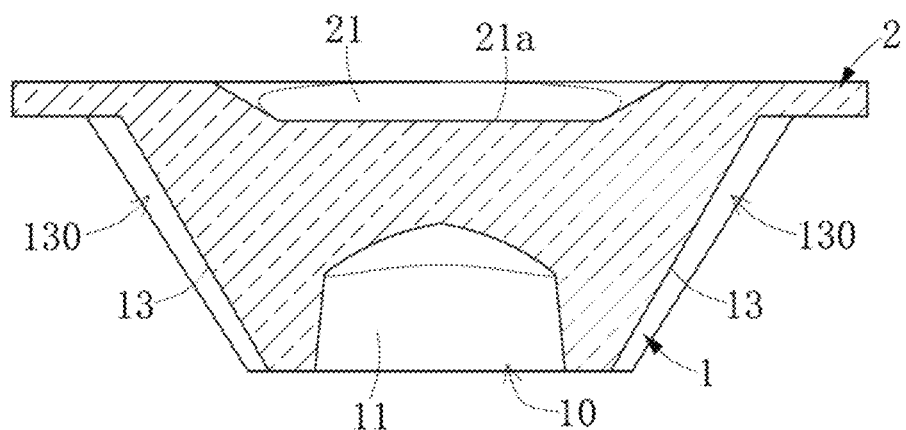
Figure 7C:
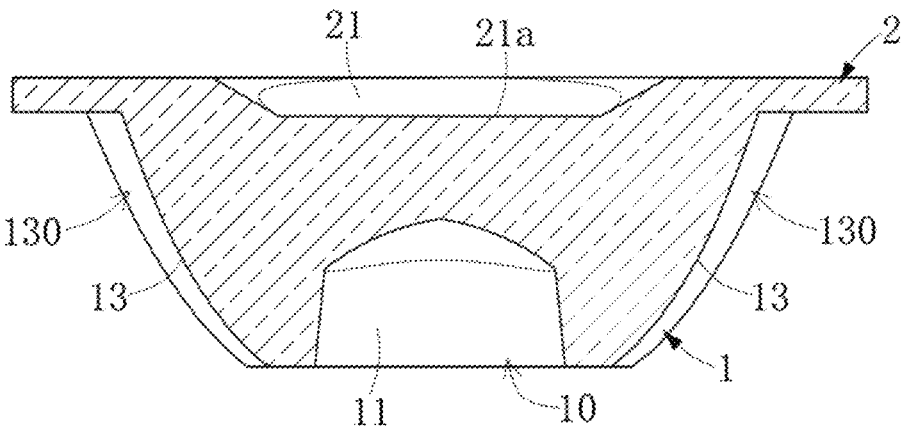
Figure 8:
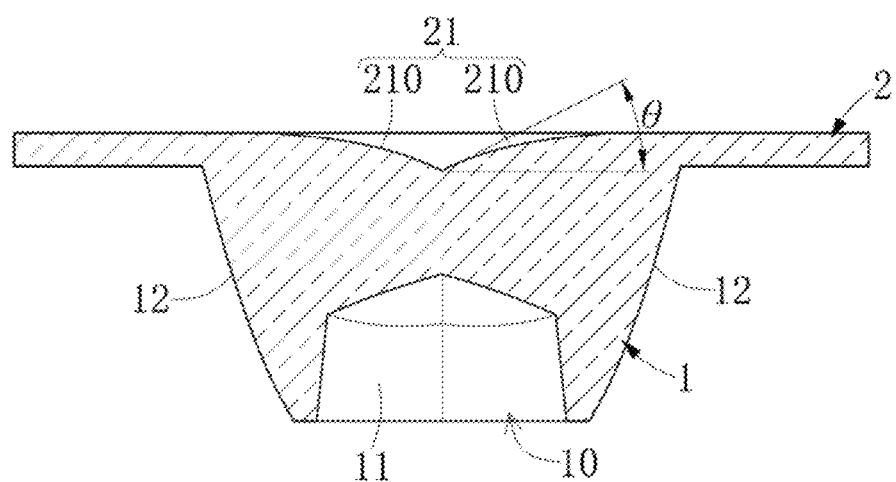
FIG. 8 is a second cross-sectional view of the first embodiment of the optical lens structure of the present disclosure.
Figure 9:
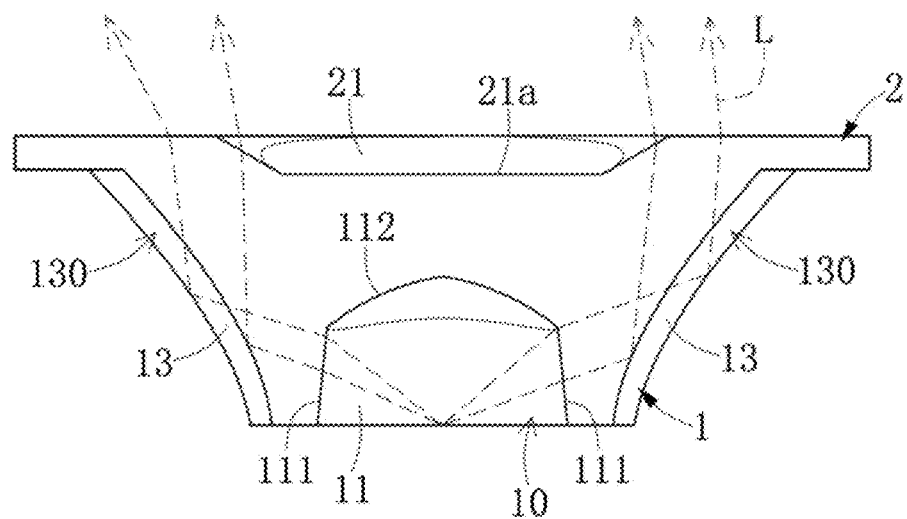
FIG. 9 is a light path diagram corresponding to a first reflection side in the first embodiment of the optical lens structure of the present disclosure.
Figure 10:
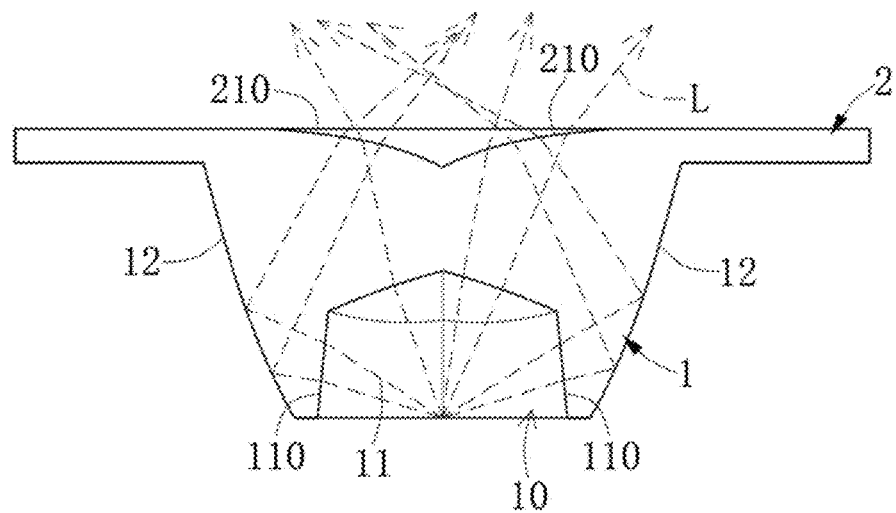
FIG. 10 is a light path diagram corresponding to a second reflection side in the first embodiment of the optical lens structure of the present disclosure.
Figure 11:
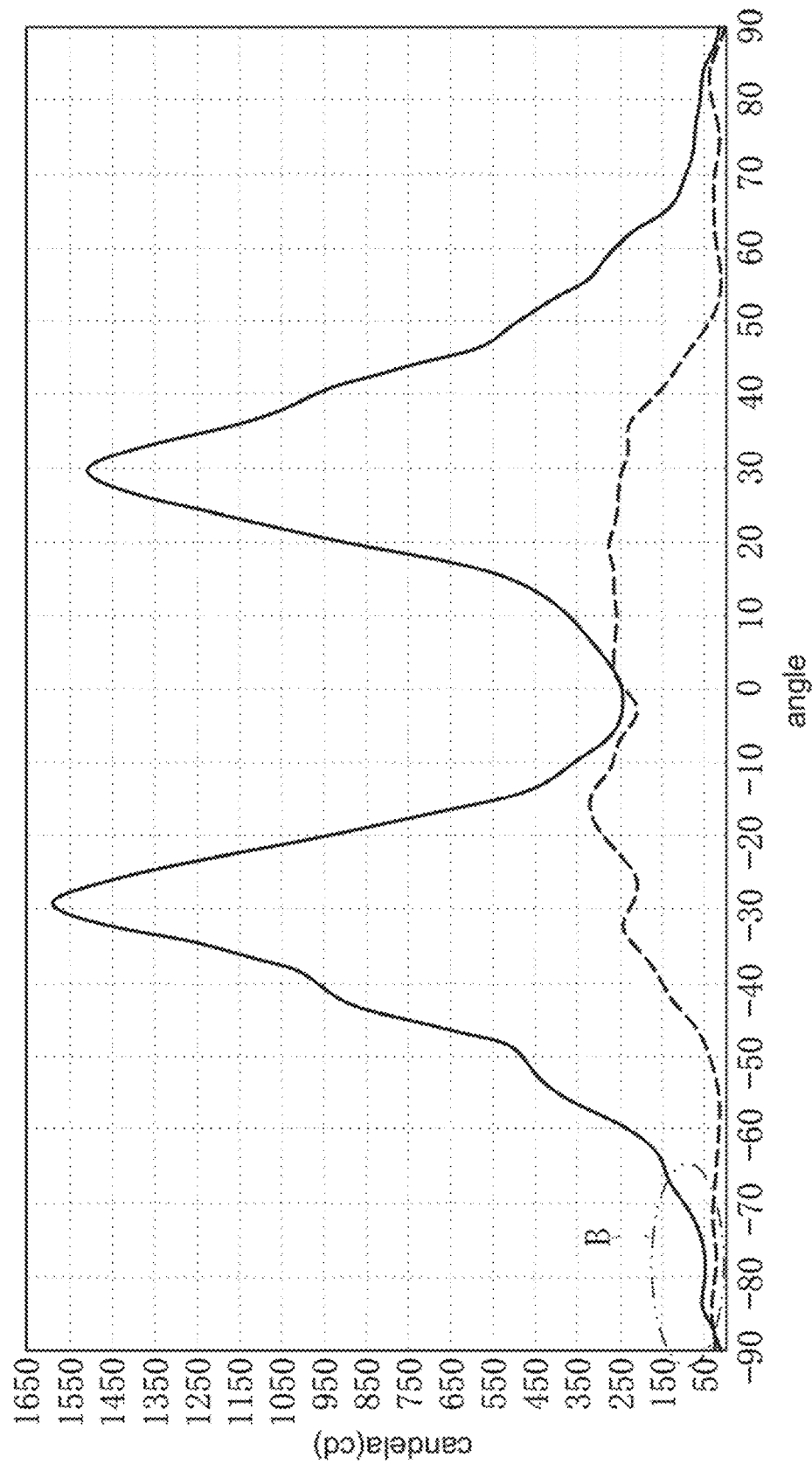
FIG. 11 is a light distribution curve of a cartesian coordinates of FIG. 9 and FIG. 10.
Figure 12:
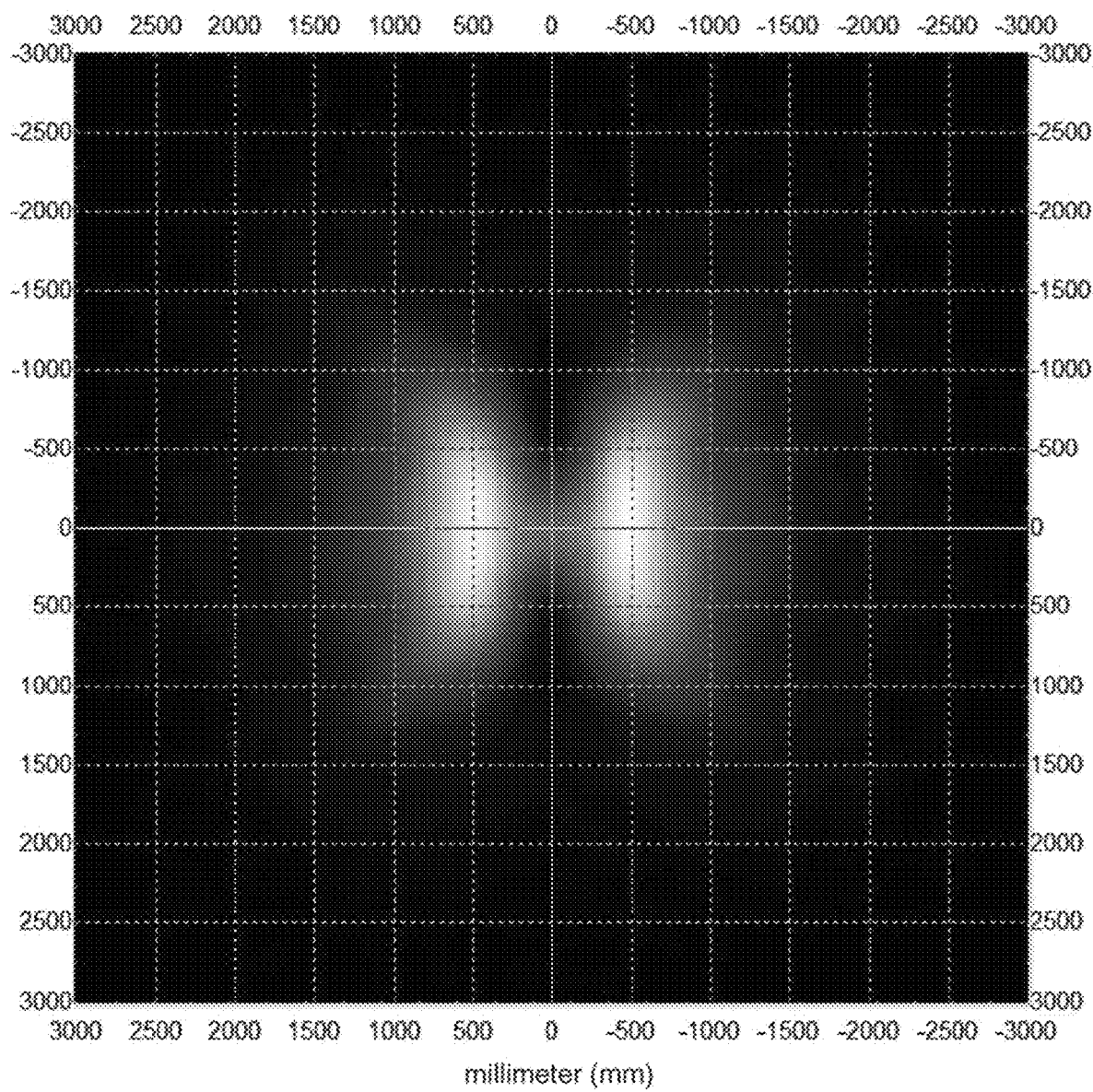
FIG. 12 is a diagram of light pattern corresponding to FIG. 9 and FIG. 10.

Please refer to FIG. 4 to FIG. 12. FIG. 4 is a bottom view of a first embodiment of the optical lens structure of the present disclosure. FIG. 5 is a top view of the first embodiment of the optical lens structure of the present disclosure. FIG. 6 is a perspective view of the first embodiment of the optical lens structure of the present disclosure. FIG. 7(a) to FIG. 7(c) are first cross-sectional views of the first embodiment of the optical lens structure of the present disclosure. FIG. 8 is a second cross-sectional view of the first embodiment of the optical lens structure of the present disclosure. FIG. 9 is a light path diagram corresponding to a first reflection side in the first embodiment of the optical lens structure of the present disclosure. FIG. 10 is a light path diagram corresponding to a second reflection side in the first embodiment of the optical lens structure of the present disclosure. FIG. 11 is a light distribution curve of a cartesian coordinates of FIG. 9 and FIG. 10. FIG. 12 is a diagram of light pattern corresponding to FIG. 9 and FIG. 10. As shown in the figures, the first embodiment of the present disclosure provides an optical lens structure Z, which includes a main body portion 1 and a projection portion 2. One side of the main body portion 1 is recessed to form an opening 10 and a light incident portion 11 corresponding to the opening 10. The main body portion 1 has a plurality of first reflection sides 12 and a plurality of second reflection sides 13 arranged opposite to the plurality of first reflection sides 12. Each of the plurality of second reflection sides 13 is recessed to form a recessed portion 130. The projection portion 2 is arranged on the other side of the main body portion 1, one side of the projection portion 2 faced away from the main body portion 1 is recessed to form a through opening 20 and a light emitting portion 21 corresponding to the through opening 20. The light incident portion 11 receives and refracts a plurality of external light beams L, so that one part of the plurality of external light beams L is projected to the light emitting portion 21, another part of the plurality of external light beams L is projected to the plurality of first reflection sides 12 and the plurality of second reflection sides 13, and further another part of the plurality of external light beams L is reflected and projected toward the light emitting portion 21 by the plurality of first reflection sides 12 and the plurality of second reflection sides 13. The plurality of external light beams L is projected to form a plurality of irradiation ranges separated from each other by the refraction of the light emitting portion 21.

Specifically, the optical lens structure Z provided in the first embodiment includes the main body portion 1 and the projection portion 2. The main body portion 1 and the projection portion 2 can be an integrally formed structure, and the present disclosure is not limited thereto. A bottom surface of the main body portion 1 is recessed to form the opening 10 and the light incident portion 11 corresponding to the opening 10. The opening 10 is circular or oval, and the present disclosure is not limited thereto. Sides of the main body portion 1 are formed as the plurality of first reflection sides 12 and the plurality of second reflection sides 13 arranged orthogonal to the plurality of first reflection sides 12. Two sides of one of the pluralities of first reflection sides 12 are respectively connected to one side of the plurality of second reflection sides 13, and two sides of the other of the plurality of first reflection sides 12 are respectively connected to the other side of the plurality of second reflection sides 13. Each of the plurality of second reflection sides 13 is recessed to form the recessed portion 130. A side length of the other side of each of the plurality of first reflection sides 12 corresponding to the main body portion 1 is greater than a side length of the other side of each of the plurality of second reflection sides 13. The plurality of first reflection sides 12 and the plurality of second reflection sides 13 may have a total internal reflection (TIR) structure. The projection portion 2 can be a circular cake structure, and the present disclosure is not limited thereto. The projection portion 2 may be disposed on a top surface of the main body portion 1, and a side of the projection portion 2 facing away from the top surface of the main body portion 1 may be recessed to form a through opening 20 and the light emitting portion 21 corresponding to the through opening 20. The through opening 20 is circular or oval, and the present disclosure is not limited thereto.

Therefore, when the optical lens structure Z is operated, a light emitting module (not shown in the figures, it can be a light-emitting diode) can be disposed on the bottom surface of the main body portion 1. Afterward, after the light emitting module projects the plurality of external light beams L, a part of the external light beams L can be directly projected to the light emitting portion 21 by being received and refracted in the light incident portion 11. The other part of the external light beams L can be projected to the plurality of first reflection sides 12 and the plurality of second reflection sides 13, and then can be projected to the light emitting portion 21 by being reflected with the plurality of first reflection sides 12 and the plurality of second reflection sides 13. Finally, the plurality of external light beams L is projected out of a plurality of irradiation ranges separated from each other by the plurality of the external light beams L being refracted in the light emitting portion 21, and each irradiation range may present a strip-shaped light pattern as shown in FIG. 12.

Figure 1:
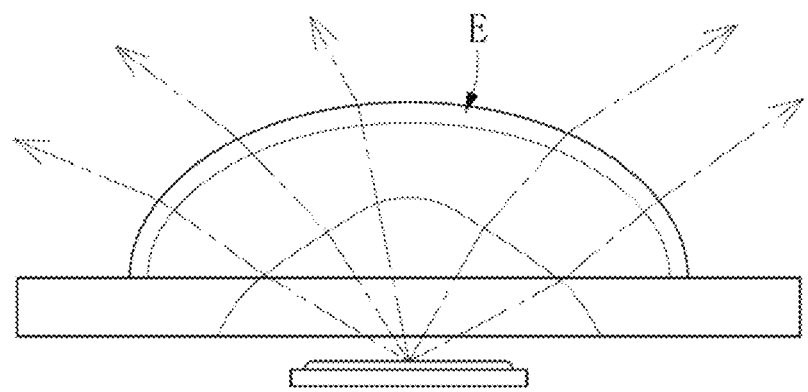
FIG. 1 is a schematic diagram of a structure and optical path of a conventional optical lens.
Figure 2:
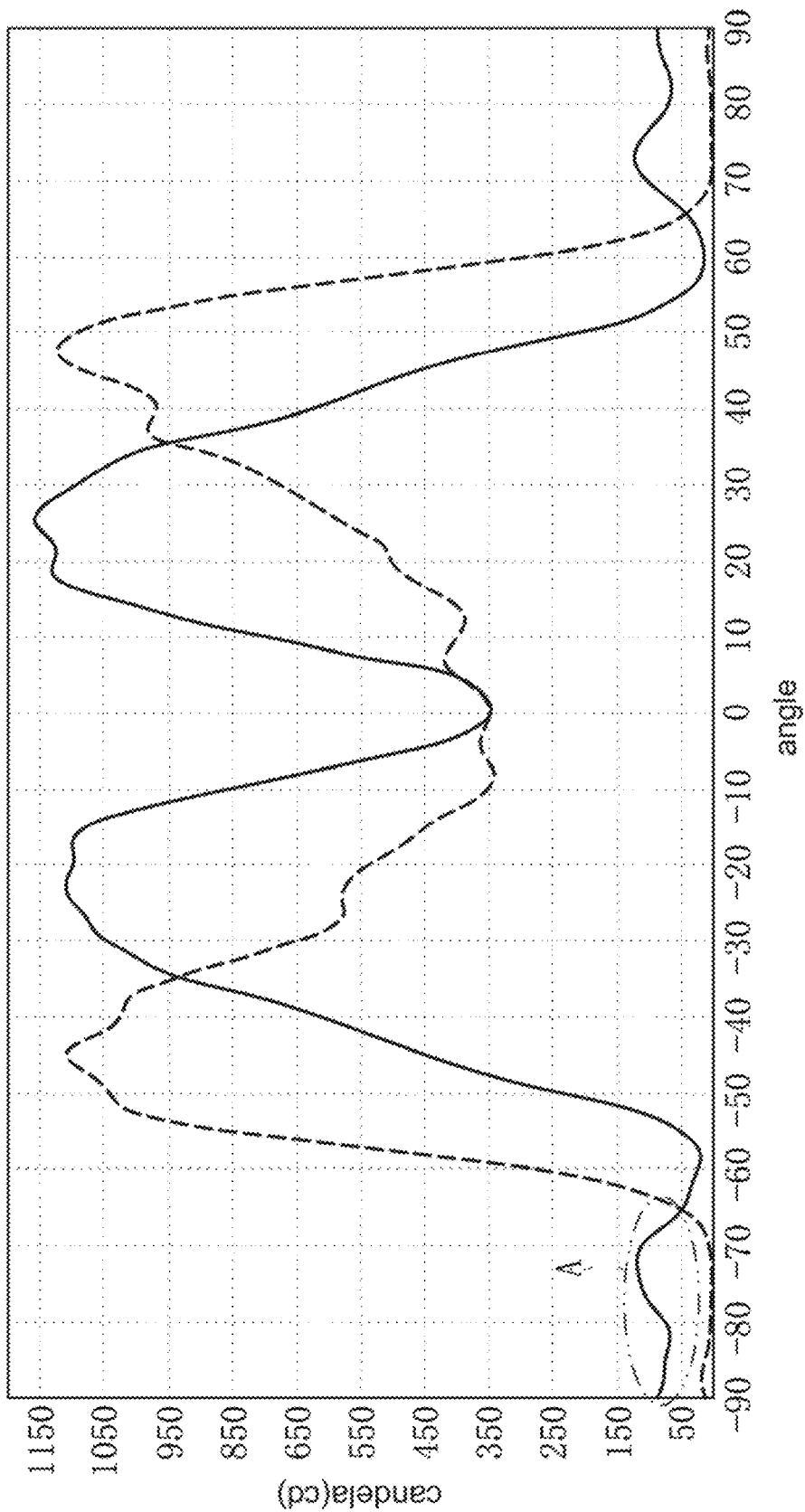
FIG. 2 is a light distribution curve of a cartesian coordinates of FIG. 1.
Figure 3:
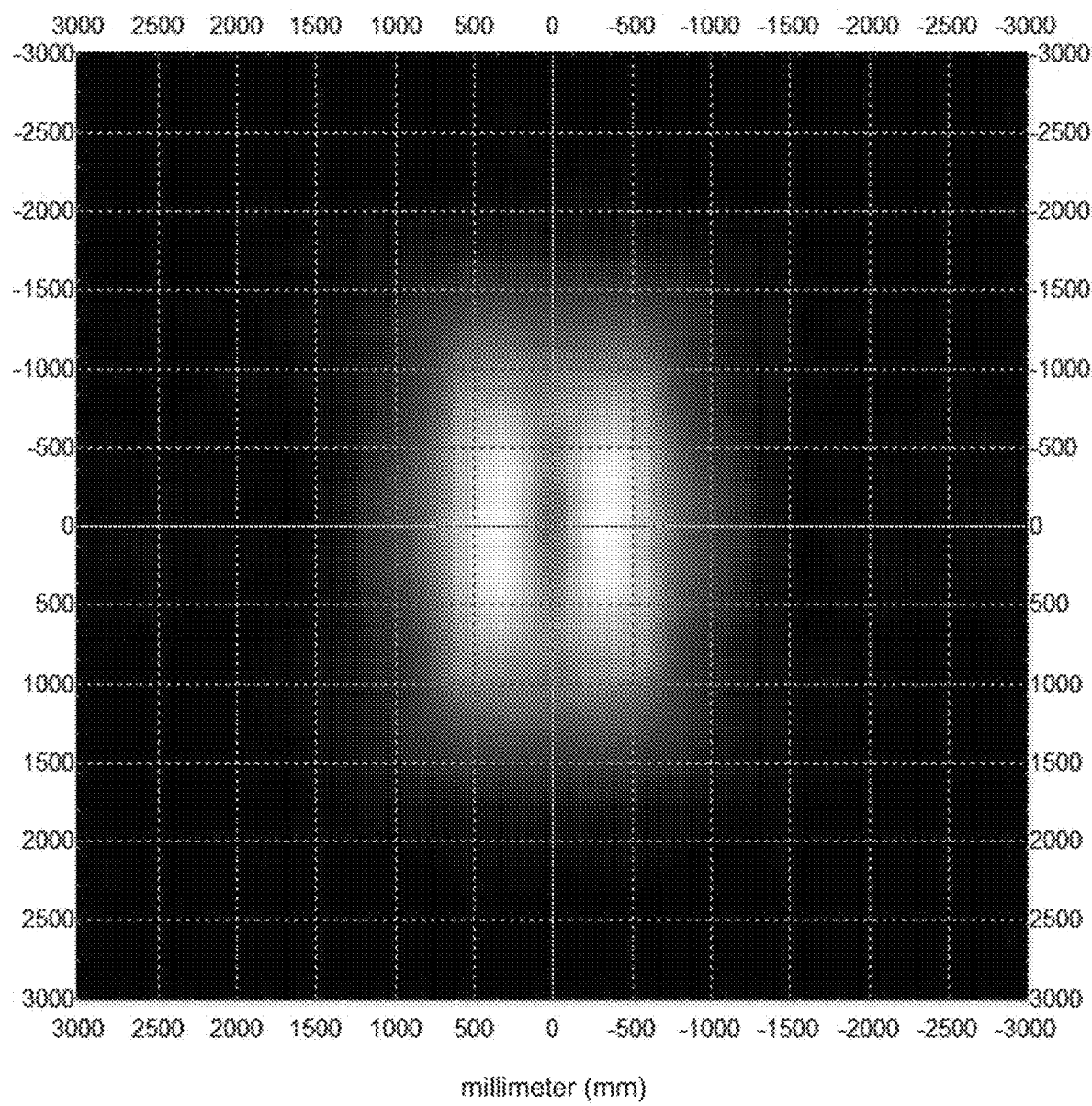
FIG. 3 is a diagram of light pattern corresponding to FIG. 1.

Thereby, the optical lens structure Z is arranged by the above-mentioned structure, that is, the optical lens structure Z is arranged by the TIR structure of the plurality of first reflection sides 12 and the plurality of second reflection sides 13, and concave structure of the second reflection side 13. In addition, with the projection portion 2 can project a long biaxial light pattern, simultaneously reduce glare and increase utilization rate of large-angle light, thereby improving lighting effect of the optical lens structure. According to the comparison of FIGS. 11 and 12 with FIGS. 2 and 3, it can be seen that the optical lens structure Z can significantly reduce glare compared with the conventional optical lens (as shown at A in FIG. 2 and B in FIG. 11), and can also project the long biaxial light pattern.

As shown in FIG. 11, the optical lens structure Z is configured by the above-mentioned structure, and a range of polarization angle of the long biaxial light pattern projected (that is, two peaks shown in FIG. 11) is between 5° and 70° or between −5° and −70°. Moreover, the two peaks in FIG. 11 also correspond to the biaxial light pattern shown in FIG. 12.

As shown in FIG. 6 to FIG. 8, the other side of the main body portion 1 gradually shrinks toward the one side of the main body portion 1. A cross-section surface of each of the first reflection sides 12 is arc shaped, a cross-section surface of each of the second reflection sides 13 is arc shaped, or the cross-section surface of each of the first reflection sides 12 and the cross-section surface of each of the second reflection sides 13 are arc shaped. Or, the cross-section surface of each of the first reflection sides 12 is line shaped, the cross-section surface of each of the second reflection sides 13 is line shaped, or the cross-section surface of each of the first reflection sides 12 and the cross-section surface of each of the second reflection sides 13 are line shaped.

For example, as shown in FIG. 7(a) to FIG. 7(c), the cross-section surface of each of the plurality of first reflection sides 12 can be inverted arc shaped (as shown in FIG. 7(a)), line shaped (as shown in FIG. 7(b)), or a regular arc (as shown in FIG. 7(c)). As shown in FIG. 8, the cross-section surface of each of the plurality of second reflection sides 13 can also be a regular arc shape, an inverse arc shape (similar to FIG. 7(a)) or a straight line shaped (similar to FIG. 7(b)). However, the plurality of first reflection sides 12 and the plurality of second reflection sides 13 are not limited to the above-mentioned embodiments.

In addition, the side of the projection portion 2 faced away from the top surface of the main body portion 1 can also be a complete flat surface without the through opening 20 and the light emitting portion 21.

However, the above-mentioned example is only one of the feasible embodiments, and the present disclosure is not limited thereto.

Second Embodiment

Please refer to FIG. 13 to FIG. 15(b), which are respectively a bottom view, a cross-sectional diagram, and top views of the second embodiment of the present disclosure. Please also refer to FIG. 4 to FIG. 12. As shown in the figures, the optical lens structure Z of the second embodiment is similar to the aforementioned first embodiment, and will not be repeated here. In the second embodiment, the light incident portion 11 has a plurality of first refraction sides 110, a plurality of second refraction sides 111, and a third refraction side 112. The plurality of first refraction sides 110 correspond to the plurality of first reflection sides 12. The plurality of second refraction sides 111 correspond to the plurality of second reflection sides 13. The third refraction side 112 connects the plurality of first refraction sides 110 and the plurality of second refraction sides 111. Each of the plurality of second refraction sides 111 protrudes to form a protruding portion 111a, the protruding portion 111a toward inside of the main body portion 1, and the protruding portion 111a of each of the plurality of second refraction sides 111 corresponds to the recessed portion 130 of one of the pluralities of second refraction sides 111.

Figure 13:
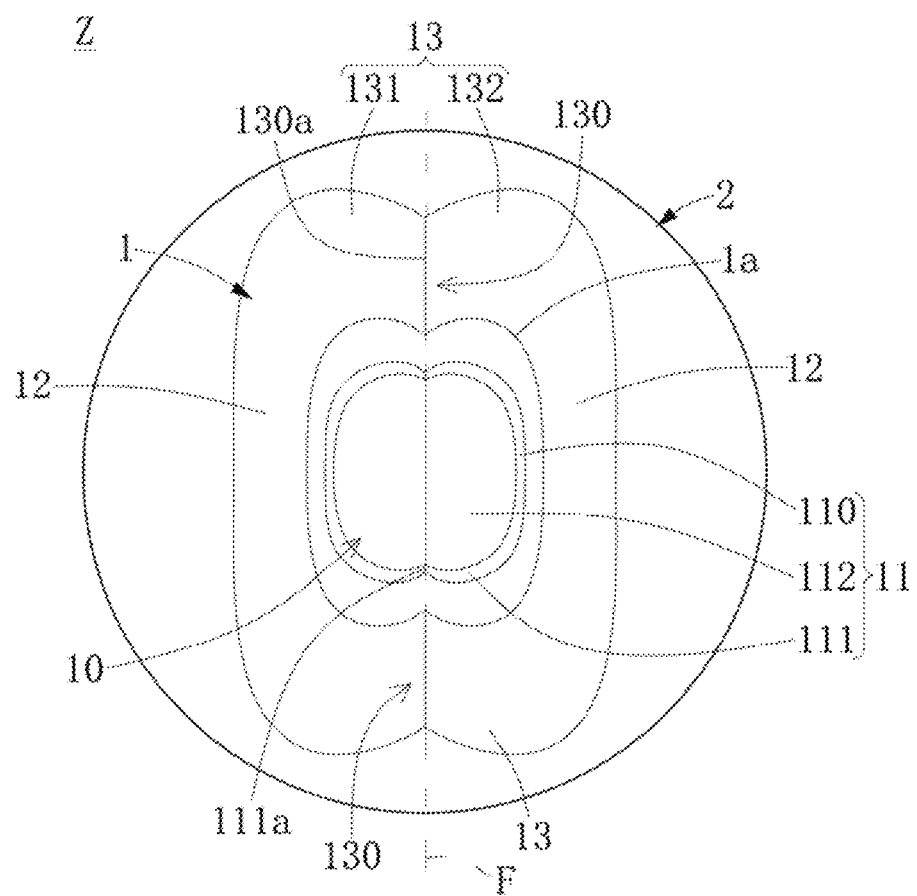
FIG. 13 is a bottom view of a second embodiment of the optical lens structure of the present disclosure.

For example, the light incident portion 11 has the plurality of first refraction sides 110, the plurality of second refraction sides 111, and the third refraction side 112. Each of the plurality of first refraction sides 110 corresponds to one of the first reflection sides 12. Each of the plurality of second refraction sides 111 corresponds to one of the second reflection sides 13. The third refraction side 112 is connected to the plurality of first refraction sides 110 and the plurality of second refraction sides 111. Two sides of one of the pluralities of first refraction sides 110 are respectively connected to one side of the plurality of second refraction sides 111, and two sides of the other of the plurality of first refraction sides 110 are respectively connected to the other side of the plurality of second refraction sides 111. As shown in FIG. 13, each of the plurality of second refraction sides 111 protrudes to form the protruding portion 111a, the protruding portion 111a toward inside of the main body portion 1, and the protruding portion 111a of each of the plurality of second refraction sides 111 corresponds to the recessed portion 130 of one of the pluralities of second reflection sides 13.

An outer edge 1a of the one side of the main body portion 1 corresponds to the plurality of first refraction sides 110 and the plurality of second refraction sides 111. A shape of the opening 10 corresponds to the plurality of first refraction sides 110 and the plurality of second refraction sides 111. For example, as shown in FIG. 13, the shape of the opening 10 at the outer edge 1a of the bottom surface of the main body portion 1 may correspond to the plurality of first refraction sides 110 and the plurality of second refraction sides 111.

Each of the plurality of second reflection sides 13 is divided into a first arc side 131 and a second arc side 132 by a first dividing line 130a, and the first arc side 131 and the second arc side 132 are symmetrical and connected to each other. The main body portion 1 forms a reference surface F based on a plurality of the first dividing lines 130a, and the reference surface F overlaps the plurality of the first dividing lines 130a. The light emitting portion 21 has a second dividing line 21a, and the second dividing line 21a overlaps the reference surface F. The light emitting portion 21 is divided into a plurality of arc surfaces 210 by the second dividing line 21a, and the plurality of arc surfaces 210 are connected to each other and opposite to each other. As shown in FIG. 8, a range of angle θ of each arc surface 210 may between 5° to 45°.

For example, as shown in FIG. 13 to FIG. 15(b), each of the plurality of second reflection sides 13 is divided into a first arc side 131 and a second arc side 132 by the first dividing line 130*a*, and the first arc side 131 and the second arc side 132 are symmetrical and connected to each other. The main body portion 1 can also form the reference surface F overlapping with the plurality of first dividing lines 130*a* based on the plurality of first dividing lines 130*a*. The pluralities of first dividing lines 130*a* are located on the reference surface F.

Figure 14:
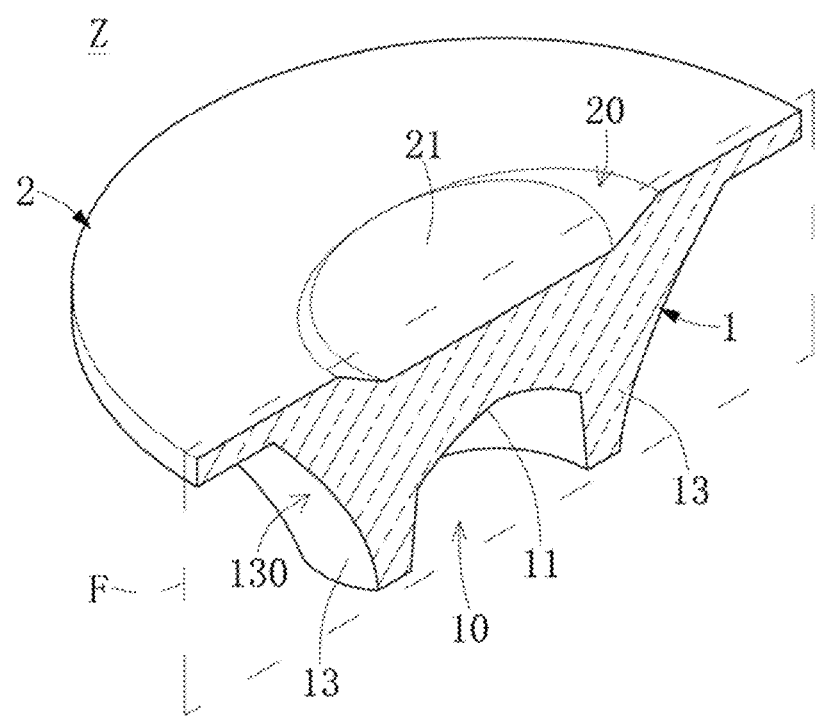
FIG. 14 is a cross-sectional view of the second embodiment of the optical lens structure of the present disclosure.
Figure 15A:
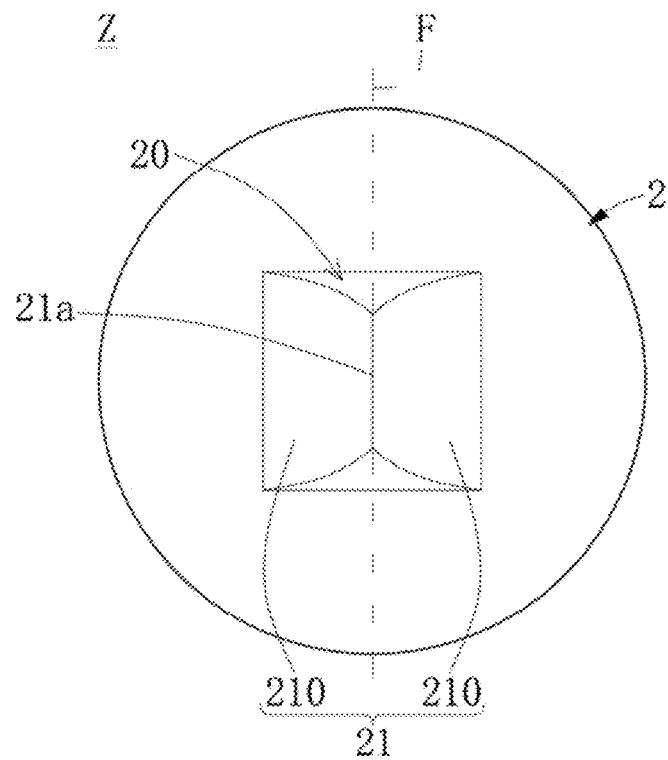
FIG. 15(a) to FIG. 15(b) are top views of the second embodiment of the optical lens structure of the present disclosure.
Figure 15B:
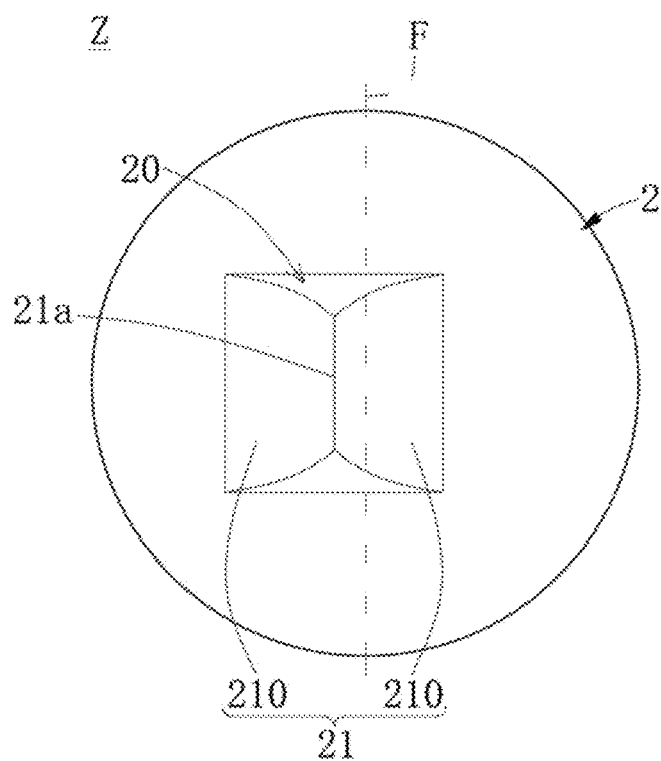

As shown in FIG. 8, and FIG. 13 to FIG. 15(*b*), the light emitting portion 21 may have the second dividing line 21*a*. The light emitting portion 21 is divided into the plurality of arc surfaces 210 by the second dividing line 21*a*, and the plurality of arc surfaces 210 are connected to each other and opposite to each other. The second dividing line 21*a* overlaps the reference surface F (as shown in FIG. 15(*a*)). The second dividing line 21*a* and the plurality of first dividing lines 130*a* are located on the reference surface F.

The light emitting portion 21 has the second dividing line 21*a*, an extension direction of the second dividing line 21*a* is same as an extension direction of the reference surface F, and the second dividing line 21*a* does not intersect the reference surface F. As shown in FIG. 13 to FIG. 15(*a*) to FIG. 15(*b*), the second dividing line 21*a* may also not overlap with the reference surface F (as shown in FIG. 15(*b*)). The extension direction of the second dividing line 21*a* from one end to the other end is the same as the extension direction of the reference surface F from one end to the other end, and the second dividing line 21*a* does not intersect the reference surface F (as shown in FIG. 15(*b*)). In other words, the second dividing line 21*a* may be parallel to the reference surface F or slightly inclined to the reference surface F. A setting position of the second dividing line 21*a* relative to the reference surface F (i.e., the plurality of first dividing lines 130*a*) is used to adjust project positions of the plurality of irradiation ranges (i.e., light patterns) formed by the plurality of external light beams L projected by the light emitting portion 21 (as shown in FIG. 12, adjusting the light patterns to the left or right).

As shown in FIG. 15(*a*) to FIG. 15(*b*), the through opening 20 is polygonal, circular or oval, and the present disclosure is not limited thereto.

However, the above-mentioned example is only one of the feasible embodiments, and the present disclosure is not limited thereto.

Third Embodiment

Figure 16:
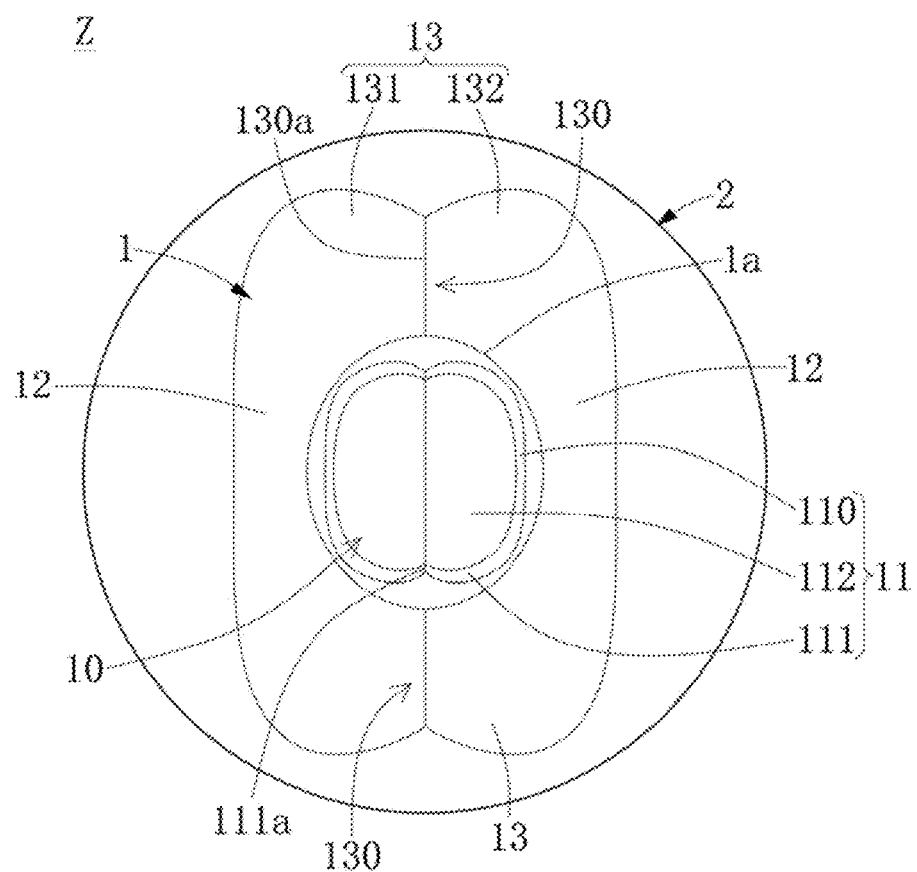
FIG. 16 is a bottom view of a third embodiment of the optical lens structure of the present disclosure.
Figure 17:
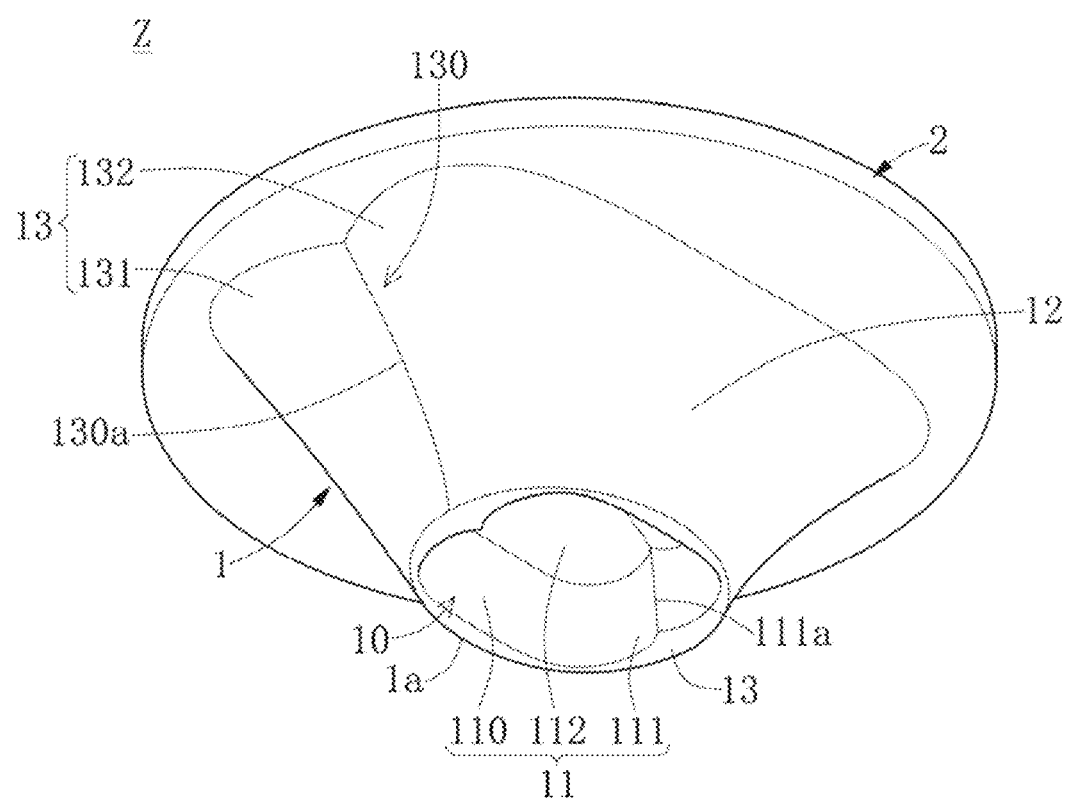
FIG. 17 is a perspective view of the third embodiment of the optical lens structure of the present disclosure.

Please refer to FIG. 16 to FIG. 17, which are respectively a bottom view, and a perspective view of the third embodiment of the present disclosure. Please also refer to FIG. 4 to FIG. 15(*b*). As shown in the figures, the optical lens structure Z of the third embodiment is similar to above embodiments, and will not be repeated here. In the third embodiment, an outer edge 1*a* of the one side of the main body portion 1 is circular or oval. The shape of the opening 10 corresponds to the plurality of first refraction sides 110 and the plurality of second refraction sides 111.

However, the above-mentioned example is only one of the feasible embodiments, and the present disclosure is not limited thereto.

Fourth Embodiment

Figure 18:
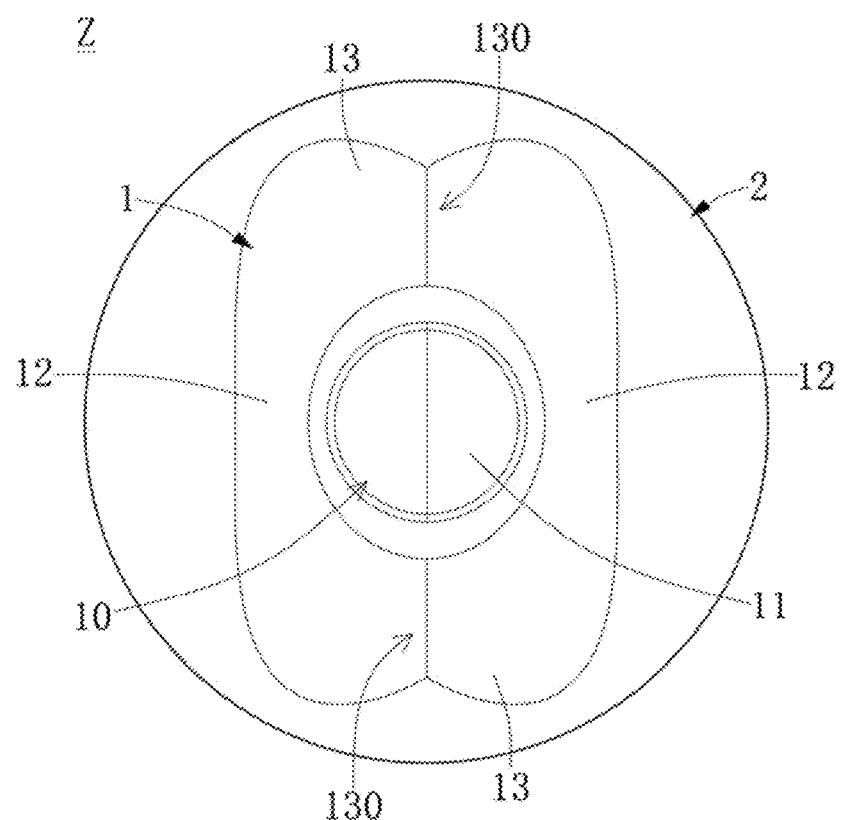
FIG. 18 is a bottom view of a fourth embodiment of the optical lens structure of the present disclosure.

Please refer to FIG. 18, which is a bottom view of the fourth embodiment of the present disclosure. Please also refer to FIG. 4 to FIG. 17. As shown in the figures, the optical lens structure Z of the fourth embodiment is similar to above embodiments, and will not be repeated here. In the fourth embodiment, the outer edge 1*a* of the one side of the main body portion 1 is circular or oval, the opening 10 is circular or oval.

However, the above-mentioned example is only one of the feasible embodiments, and the present disclosure is not limited thereto.

Beneficial Effects of Embodiments

A beneficial effect of the present disclosure is that the optical lens structure Z can reduce glare and increase utilization rate of large-angle light by following technical solutions. One side of the main body portion 1 is recessed to form the opening 10 and the light incident portion 11 corresponding to the opening 10. The main body portion 1 has the plurality of first reflection sides 12 and the plurality of second reflection sides 13 arranged orthogonal to the plurality of first reflection sides 12. Each of the plurality of second reflection sides 13 is recessed to form the recessed portion 130. The projection portion 2 is arranged on the other side of the main body portion 1, one side of the projection portion 2 faced away from the main body portion 1 is recessed to form the through opening 20 and the light emitting portion 21 corresponding to the through opening 20. The light incident portion 11 receives and refracts the plurality of external light beams L, so that one part of the plurality of external light beams L is projected to the light emitting portion 21, another part of the plurality of external light beams L is projected to the plurality of first reflection sides 12 and the plurality of second reflection sides 13, and further another part of the plurality of external light beams L is reflected and projected toward the light emitting portion 21 by the plurality of first reflection sides 12 and the plurality of second reflection sides 13. The plurality of external light beams L is projected to form the plurality of irradiation ranges separated from each other by the refraction of the light emitting portion 21.

Furthermore, the optical lens structure Z can be mainly arranged by main structure of the main body portion 1, the optical lens structure Z is arranged by the TIR structure of the plurality of first reflection sides 12 and the plurality of second reflection sides 13, and concave structure of the second reflection side 13. In addition, with the projection portion 2 can project a long biaxial light pattern, simultaneously reduce glare and increase utilization rate of large-angle light. In addition, the optical lens structure Z can also be adjusted by changing the shape of the outer edge 1*a* of one side (i.e., the bottom) of the main body portion 1, the shape of the opening 10, and the structure of the light emitting portion 21 to adjust size, brightness distribution or projection position of each of the plurality of irradiation ranges.

The content disclosed above is only a preferred feasible embodiment of the present disclosure, and is not therefore limited to the claims of the present disclosure. All equivalent technical changes made by using the description of the present disclosure and the content of the drawings are included in the claims of the present disclosure.

What is claimed is:
1. An optical lens structure comprising:
   a main body portion, one side of the main body portion recessed to form an opening and a light incident portion corresponding to the opening, the main body portion having a plurality of first reflection sides and a plurality of second reflection sides arranged orthogonal to the plurality of first reflection sides, each of the plurality of second reflection sides recessed to form a recessed portion; and a projection portion arranged on the other side of the main body portion, one side of the projection portion faced away from the main body portion recessed to form a through opening and a light emitting portion corresponding to the through opening, wherein, the light incident portion receives and refracts a plurality of external light beams, so that one part of the plurality of external light beams is projected to the light emitting portion, another part of the plurality of external light beams is projected to the plurality of first reflection sides and the plurality of second reflection sides, and further another part of the plurality of external light beams is reflected and projected toward the light emitting portion by the plurality of first reflection sides and the plurality of second reflection sides, wherein, the plurality of external light beams projects a plurality of irradiation ranges separated from each other by the plurality of the external light beams being refracted in the light emitting portion, wherein, each of the recessed portions has a first dividing line, each of the plurality of second reflection sides is divided into a first arc side and a second arc side by the first dividing line, and the first arc side and the second arc side are symmetrical and connected to each other, wherein, the main body portion forms a reference surface based on a plurality of the first dividing lines, and the reference surface overlaps the plurality of the first dividing lines, wherein, an outer edge of the one side of the main body portion is circular or oval, wherein the opening is circular or oval.

2. An optical lens structure comprising:

a main body portion, one side of the main body portion recessed to form an opening and a light incident portion corresponding to the opening, the main body portion having a plurality of first reflection sides and a plurality of second reflection sides arranged opposite orthogonal to the plurality of first reflection sides, each of the plurality of second reflection sides recessed to form a recessed portion; and a projection portion arranged on the other side of the main body portion, one side of the projection portion faced away from the main body portion recessed to form a through opening and a light emitting portion corresponding to the through opening, wherein, the light incident portion receives and refracts a plurality of external light beams, so that one part of the plurality of external light beams is projected to the light emitting portion, another part of the plurality of external light beams is projected to the plurality of first reflection sides and the plurality of second reflection sides, and further another part of the plurality of external light beams is reflected and projected toward the light emitting portion by the plurality of first reflection sides and the plurality of second reflection sides, wherein, the plurality of external light beams projects a plurality of irradiation ranges separated from each other by the plurality of the external light beams being refracted in the light emitting portion, wherein, each of the recessed portions has a first dividing line, each of the plurality of second reflection sides is divided into a first arc side and a second arc side by the first dividing line, and the first arc side and the second arc side are symmetrical and connected to each other, wherein, the main body portion forms a reference surface based on a plurality of the first dividing lines, and the reference surface overlaps the plurality of the first dividing lines, wherein the other side of the main body portion gradually shrinks toward the one side of the main body portion, and a cross-section surface of each of the first reflection sides is arc shaped, a cross-section surface of each of the second reflection sides is arc shaped, or the cross-section surface of each of the first reflection sides and the cross-section surface of each of the second reflection sides are arc shaped.

3. An optical lens structure comprising:

a main body portion, one side of the main body portion recessed to form an opening and a light incident portion corresponding to the opening, the main body portion having a plurality of first reflection sides and a plurality of second reflection sides arranged orthogonal to the plurality of first reflection sides, each of the plurality of second reflection sides recessed to form a recessed portion; and a projection portion arranged on the other side of the main body portion, one side of the projection portion faced away from the main body portion recessed to form a through opening and a light emitting portion corresponding to the through opening, wherein, the light incident portion receives and refracts a plurality of external light beams, so that one part of the plurality of external light beams is projected to the light emitting portion, another part of the plurality of external light beams is projected to the plurality of first reflection sides and the plurality of second reflection sides, and further another part of the plurality of external light beams is reflected and projected toward the light emitting portion by the plurality of first reflection sides and the plurality of second reflection sides, wherein, the plurality of external light beams projects a plurality of irradiation ranges separated from each other by the plurality of the external light beams being refracted in the light emitting portion, wherein, each of the recessed portions has a first dividing line, each of the plurality of second reflection sides is divided into a first arc side and a second arc side by the first dividing line, and the first arc side and the second arc side are symmetrical and connected to each other, wherein, the main body portion forms a reference surface based on a plurality of the first dividing lines, and the reference surface overlaps the plurality of the first dividing lines, wherein the other side of the main body portion gradually shrinks toward the one side of the main body portion, and a cross-section surface of each of the first reflection sides is line shaped, a cross-section surface of each of the second reflection sides is line shaped, or the cross-section surface of each of the first reflection sides and the cross-section surface of each of the second reflection sides are line shaped.

4. The optical lens structure as claimed in claim 1, wherein the light incident portion has a plurality of first refraction sides, a plurality of second refraction sides, and a third refraction side, wherein the plurality of first refraction sides correspond to the plurality of first reflection sides, the plurality of second refraction sides correspond to the plurality of second reflection sides, and the third refraction side connects the plurality of first refraction sides and the plurality of second refraction sides, each of the plurality of second refraction sides protrudes toward the inside of the main body portion to form a protruding portion, and the protruding portion of each of the plurality of second refraction sides corresponds to the recessed portion of one of the plurality of second refraction sides, wherein an outer edge of the one side of the main body portion corresponds to the plurality of first refraction sides and the plurality of second refraction sides, wherein a shape of the opening corresponds to the plurality of first refraction sides and the plurality of second refraction sides.

5. The optical lens structure as claimed in claim 1, wherein the light emitting portion has a second dividing line, and the second dividing line overlaps the reference surface, wherein the light emitting portion is divided into a plurality of arc surfaces by the second dividing line, and the plurality of arc surfaces are connected to each other and opposite to each other.

6. The optical lens structure as claimed in claim 1, wherein the light emitting portion has a second dividing line, an extension direction of the second dividing line is same as an extension direction of the reference surface, and the second dividing line does not intersect the reference surface, wherein the light emitting portion is divided into a plurality of arc surfaces by the second dividing line, and the plurality of arc surfaces are connected to each other and opposite to each other.

7. The optical lens structure as claimed in claim 1, wherein the through opening is polygonal, circular or oval.

8. The optical lens structure as claimed in claim 1, wherein the main body portion and the projection portion are integrally formed.

* * * * *